United States Patent
Narita et al.

(10) Patent No.: US 10,943,610 B2
(45) Date of Patent: Mar. 9, 2021

(54) MAGNETIC HEAD WITH STACKED BODY AND INSULATING PORTION ARRANGEMENT BETWEEN MAGNETIC POLE AND SHIELD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Naoyuki Narita, Chiba (JP); Tomoyuki Maeda, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/351,050

(22) Filed: Mar. 12, 2019

(65) Prior Publication Data
US 2020/0075045 A1    Mar. 5, 2020

(30) Foreign Application Priority Data

Sep. 4, 2018    (JP) .............................. JP2018-165500

(51) Int. Cl.
     *G11B 5/235*      (2006.01)
     *G11B 5/31*      (2006.01)
     (Continued)

(52) U.S. Cl.
     CPC .......... *G11B 5/3146* (2013.01); *G11B 5/1278* (2013.01); *G11B 5/235* (2013.01);
     (Continued)

(58) Field of Classification Search
None
See application file for complete search history.

(56) References Cited

U.S. PATENT DOCUMENTS 8,254,059 B2    8/2012    Horide et al.
9,076,463 B2    7/2015    Yamada et al.
(Continued)

FOREIGN PATENT DOCUMENTS

JP    2012-123894 A    6/2012
JP    2015-210835 A    11/2015

OTHER PUBLICATIONS

Zhu et al., "Microwave Assisted Magnetic Recording Utilizing Perpendicular Spin Torque Oscillator With Switchable Perpendicular Electrodes," IEEE Transactions on Magnetics, vol. 46, No. 3, pp. 751-757 (2010).

*Primary Examiner* — Craig A. Renner
(74) *Attorney, Agent, or Firm* — Finnegan, Henderson, Farabow, Garrett & Dunner, L.L.P.

(57) ABSTRACT

According to one embodiment, a magnetic head includes a magnetic pole, first and second shield regions, and a first stacked body. A direction from the magnetic pole toward the first shield region is aligned with a first direction. A direction from the magnetic pole toward the second shield region crosses the first direction. The first stacked body is provided between the magnetic pole and the second shield region. The first stacked body includes a first magnetic layer including at least one selected from the group consisting of Fe, Co, and Ni, a first conductive layer provided between the magnetic pole and the first magnetic layer, and a second conductive layer provided between the first magnetic layer and the second shield region. The first direction is aligned with a direction of relative movement between the magnetic pole and a magnetic recording medium. The magnetic pole opposes the magnetic recording medium.

13 Claims, 6 Drawing Sheets

(51) Int. Cl.
*G11B 5/127* (2006.01)
*G11B 5/012* (2006.01)
*G11B 5/115* (2006.01)
*G11B 5/193* (2006.01)
*G11B 5/00* (2006.01)

(52) U.S. Cl.
CPC .............. *G11B 5/314* (2013.01); *G11B 5/315* (2013.01); *G11B 5/012* (2013.01); *G11B 5/115* (2013.01); *G11B 5/193* (2013.01); *G11B 2005/0024* (2013.01)

(56) References Cited

U.S. PATENT DOCUMENTS

| | | | |
|---|---|---|---|
| 9,390,731 B2 | 7/2016 | Koui | |
| 10,210,888 B1* | 2/2019 | Li et al. | G11B 5/315 |
| 10,325,618 B1* | 6/2019 | Wu et al. | G11B 5/1278 |
| 2015/0043106 A1* | 2/2015 | Yamada et al. | G11B 5/1278 |
| | | | 360/123.05 |
| 2019/0088275 A1 | 3/2019 | Narita et al. | |
| 2019/0244634 A1* | 8/2019 | Goncharov et al. | G11B 5/23 |
| 2020/0075047 A1* | 3/2020 | Narita et al. | G11B 5/315 |

\* cited by examiner

MAGNETIC HEAD WITH STACKED BODY AND INSULATING PORTION ARRANGEMENT BETWEEN MAGNETIC POLE AND SHIELD

CROSS-REFERENCE TO RELATED APPLICATIONS

This application is based upon and claims the benefit of priority from Japanese Patent Application No. 2018-165500, filed on Sep. 4, 2018; the entire contents of which are incorporated herein by reference.

FIELD

Embodiments described herein relate generally to a magnetic head and a magnetic recording and reproducing device.

BACKGROUND

Information is recorded in a magnetic storage medium such as a HDD (Hard Disk Drive) or the like using a magnetic head. It is desirable to increase the recording density of the magnetic head and the magnetic recording and reproducing device.

DETAILED DESCRIPTION

Figure 1A:
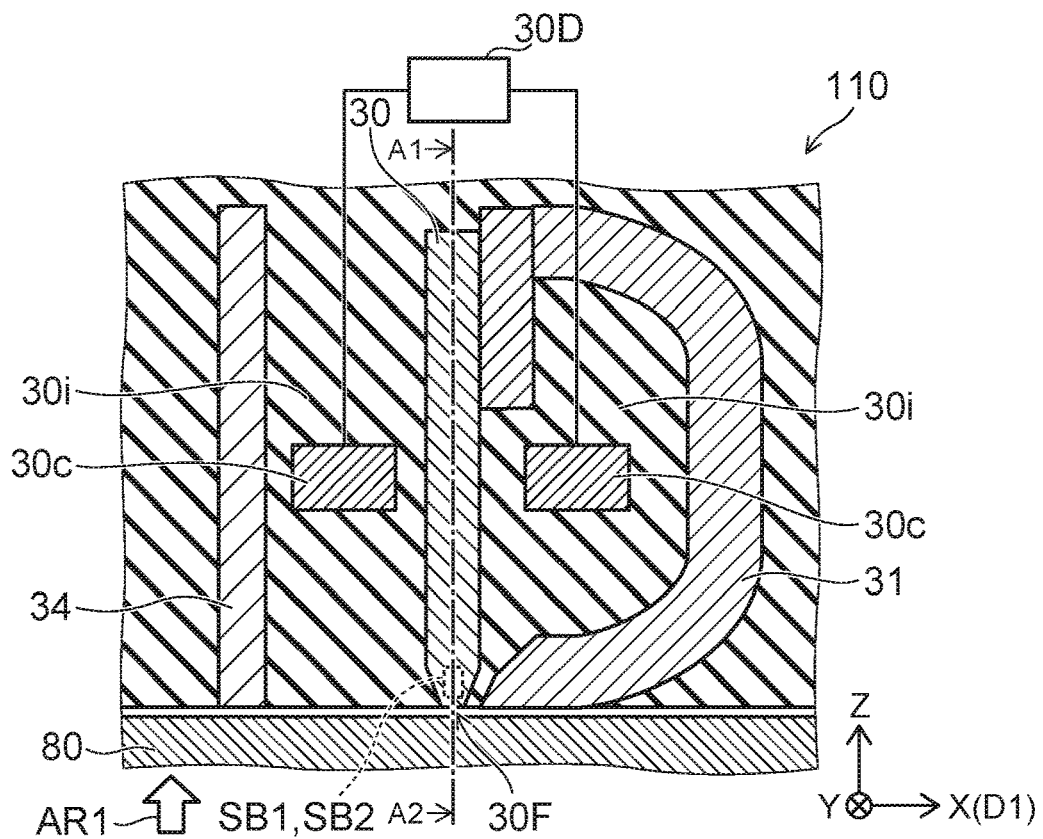
FIG. 1A and FIG. 1B are schematic views illustrating a magnetic head according to a first embodiment.

According to one embodiment, a magnetic head includes a magnetic pole, a first shield region, a second shield region, and a first stacked body. A direction from the magnetic pole toward the first shield region is aligned with a first direction. A direction from the magnetic pole toward the second shield region crosses the first direction. The first stacked body is provided between the magnetic pole and the second shield region. The first stacked body includes a first magnetic layer including at least one selected from the group consisting of Fe, Co, and Ni, a first conductive layer provided between the magnetic pole and the first magnetic layer, and a second conductive layer provided between the first magnetic layer and the second shield region. The first direction is aligned with a direction of relative movement between the magnetic pole and a magnetic recording medium. The magnetic pole opposes the magnetic recording medium.

According to another embodiment, a magnetic recording and reproducing device includes the magnetic head recited above, the magnetic recording medium, and a first electrical circuit configured to supply a current to the first stacked body.

According to another embodiment, a magnetic head includes a magnetic pole, a first shield region, a second shield region, a third shield region, a first stacked body, and a second stacked body. A direction from the third shield region toward the second shield region crosses a first direction from the magnetic pole toward the first shield region. At least a portion of the magnetic pole is provided between the third shield region and the second shield region in the direction from the third shield region toward the second shield region. The first stacked body is provided between the magnetic pole and the second shield region. The second stacked body is provided between the magnetic pole and the third shield region. The first stacked body includes a first magnetic layer including at least one selected from the group consisting of Fe, Co, and Ni, a first conductive layer provided between the magnetic pole and the first magnetic layer, and a second conductive layer provided between the first magnetic layer and the second shield region. The second stacked body includes a second magnetic layer including at least one selected from the group consisting of Fe, Co, and Ni, a third conductive layer provided between the magnetic pole and the second magnetic layer, and a fourth conductive layer provided between the second magnetic layer and the third shield region.

According to another embodiment, a magnetic recording and reproducing device includes the magnetic head recited above, a magnetic recording medium, and a first electrical circuit. Information is recorded in the magnetic recording medium by the magnetic head. The first electrical circuit is configured to supply a current to the first stacked body.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
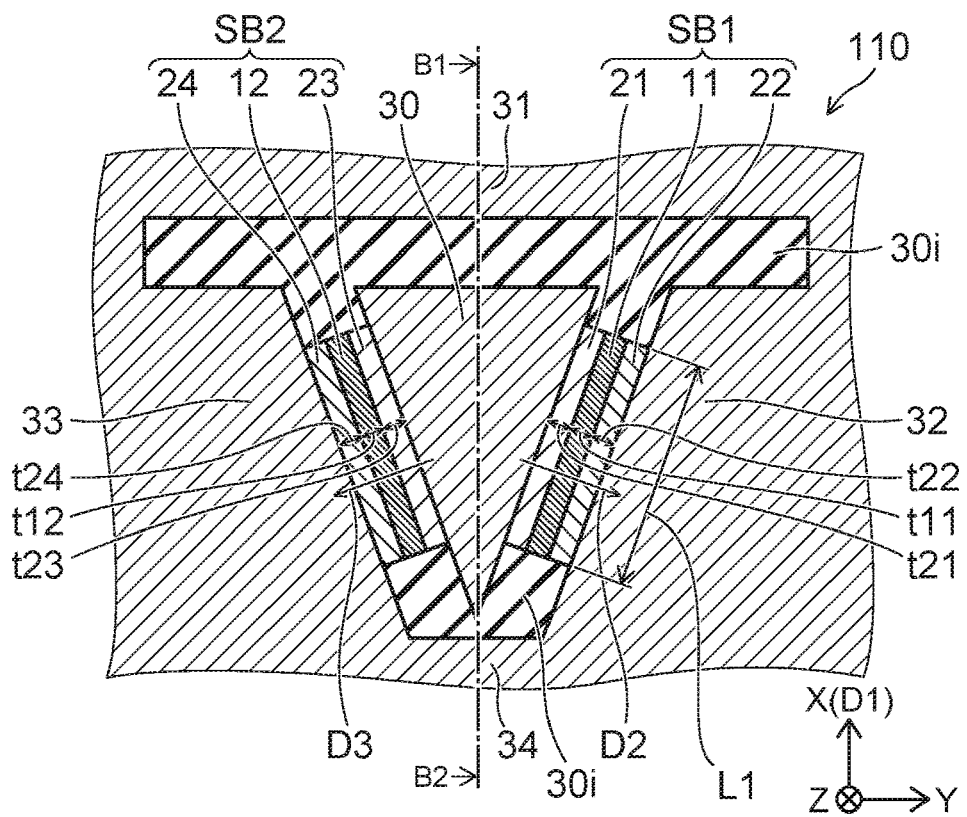
Figure 2:
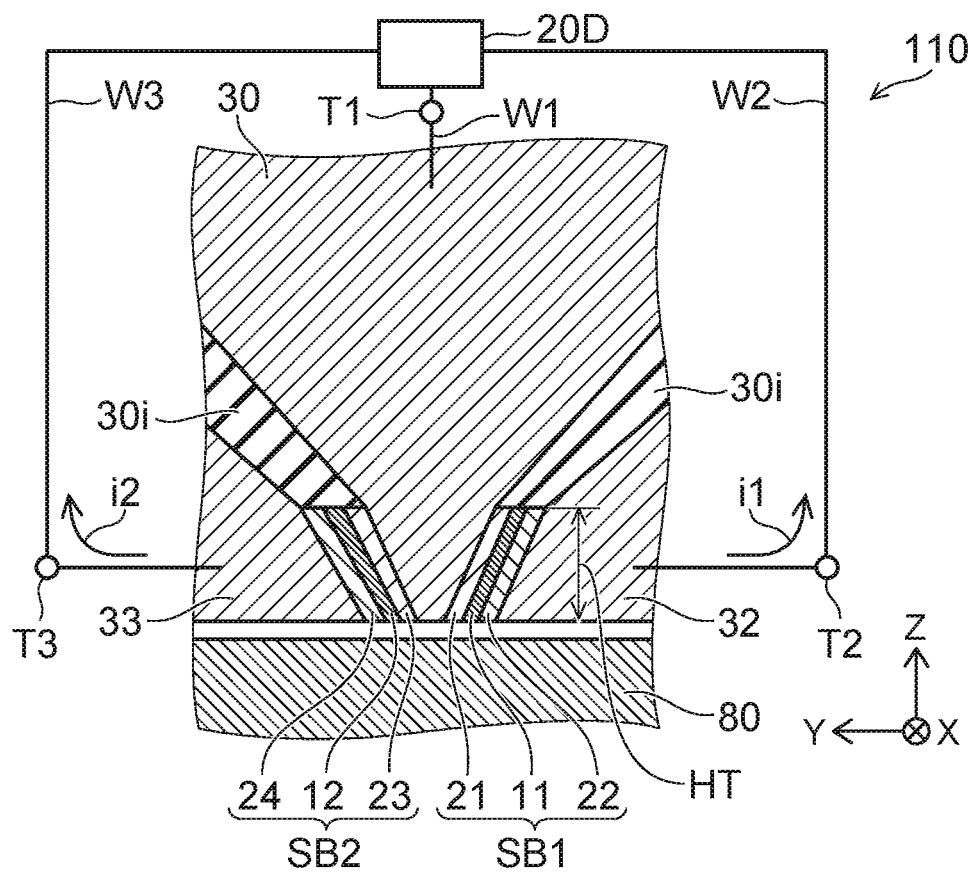
FIG. 2 is a schematic view illustrating the magnetic head according to the first embodiment.

FIG. 1A, FIG. 1B, and FIG. 2 are schematic views illustrating a magnetic head according to a first embodiment.

FIG. 1A is a line B1-B2 cross-sectional view of FIG. 1B. FIG. 1B is a plan view viewed along arrow AR1 of FIG. 1A. FIG. 2 is a line A1-A2 cross-sectional view of FIG. 1A.

As shown in FIG. 1B, the magnetic head 110 according to the embodiment includes a magnetic pole 30, a first shield region 31, a second shield region 32, and a first stacked body SB1. A third shield region 33 and a second stacked body SB2 are further provided in the example. The second shield region 32, the first stacked body SB1, the third shield region 33, and the second stacked body SB2 are not visible in the cross section shown in FIG. 1A. The positions of the first stacked body SB1 and the second stacked body SB2 are shown by a broken line in FIG. 1A.

As shown in FIG. 1A, a coil 30c and a fourth shield region 34 are further provided.

The direction from the magnetic pole 30 toward the first shield region 31 is along a first direction D1 (referring to FIG. 1A and FIG. 1B). The first direction is taken as an X-axis direction. One direction perpendicular to the X-axis direction is taken as a Z-axis direction. A direction perpendicular to the X-axis direction and the Z-axis direction is taken as a Y-axis direction.

The magnetic pole 30 is, for example, a major magnetic pole. The magnetic pole 30 has a first surface 30F. The first surface 30F opposes a magnetic recording medium 80. For example, the first surface 30F corresponds to a medium-opposing surface. For example, the first surface 30F corresponds to an ABS (Air Bearing Surface).

The magnetic pole 30 is positioned between the first shield region 31 and the fourth shield region 34. At least a portion of the coil 30c is positioned between the magnetic pole 30 and the first shield region 31. In the example, a portion of the coil 30c is positioned between the magnetic pole 30 and the fourth shield region 34.

A recording electrical circuit (a second electrical circuit 30D) is electrically connected to the coil 30c. A recording current is supplied from the recording electrical circuit to the coil 30c. A magnetic field (a recording magnetic field) that corresponds to the recording current is generated from the magnetic pole 30. The recording magnetic field is applied to the magnetic recording medium 80; and information is recorded in the magnetic recording medium 80. Thus, the recording electrical circuit (the second electrical circuit 30D) is configured to supply, to the coil 30c, a current (a recording current) corresponding to the information to be recorded.

For example, a direction perpendicular to the first surface 30F is taken as the Z-axis direction. The Z-axis direction is, for example, the height direction. The X-axis direction is, for example, the down-track direction. The Y-axis direction is, for example, the cross-track direction. The first direction D1 (the X-axis direction) is aligned with the direction of the relative movement between the magnetic pole 30 and the magnetic recording medium 80 opposed by the magnetic pole 30. The angle between the first direction D1 and the direction of the relative movement between the magnetic recording medium 80 and the magnetic pole 30 is ±25 degrees or less. This angle may be ±20 degrees or less. The absolute value of the angle between the first direction D1 and the down-track direction is less than the absolute value of the angle between the first direction D1 and the cross-track direction.

For example, the first shield region 31 corresponds to a "trailing shield." For example, the fourth shield region 34 corresponds to a "leading shield." The first shield region 31 is, for example, an auxiliary magnetic pole. The first shield region 31 can form a magnetic core with the magnetic pole 30. For example, the fourth shield region 34 may form a magnetic core with the magnetic pole 30.

As shown in FIG. 1A, for example, an insulating portion 30i is provided around the magnetic pole 30.

As shown in FIG. 1B, the direction (e.g., a second direction D2) from the magnetic pole 30 toward the second shield region 32 crosses the first direction D1 (the X-axis direction) recited above. The direction (e.g., a third direction D3) from the magnetic pole 30 toward the third shield region 33 crosses the first direction D1 (the X-axis direction) recited above.

For example, the direction from the third shield region 33 toward the second shield region 32 crosses the first direction D1 (the X-axis direction). For example, the direction from the third shield region 33 toward the second shield region 32 is aligned with the Y-axis direction. At least a portion of the magnetic pole 30 is provided between the third shield region 33 and the second shield region 32 in the direction (e.g., the Y-axis direction) from the third shield region 33 toward the second shield region 32 recited above.

For example, the second shield region 32 corresponds to a first side shield. For example, the third shield region 33 corresponds to a second side shield.

As shown in FIG. 1B, the first stacked body SB1 is provided between the magnetic pole 30 and the second shield region 32.

The first stacked body SB1 includes a first magnetic layer 11, a first conductive layer 21, and a second conductive layer 22. The first magnetic layer 11 includes at least one selected from the group consisting of Fe, Co, and Ni. The first magnetic layer 11 is, for example, an FeCo layer, an FeNi layer, etc. The first magnetic layer 11 is, for example, ferromagnetic. The first magnetic layer 11 includes, for example, a ferromagnetic metal.

The first conductive layer 21 is provided between the magnetic pole 30 and the first magnetic layer 11. The second conductive layer 22 is provided between the first magnetic layer 11 and the second shield region 32. The first conductive layer 21 and the second conductive layer 22 are, for example, nonmagnetic. The first conductive layer 21 and the second conductive layer 22 include, for example, nonmagnetic metals.

In one example, the first conductive layer 21 contacts the magnetic pole 30 and the first magnetic layer 11. In one example, the second conductive layer 22 contacts the first magnetic layer 11 and the second shield region 32.

The second stacked body SB2 is provided between the magnetic pole 30 and the third shield region 33. The second stacked body SB2 includes a second magnetic layer 12, a third conductive layer 23, and a fourth conductive layer 24. The second magnetic layer 12 includes at least one selected from the group consisting of Fe, Co, and Ni. The second magnetic layer 12 is, for example, an FeCo layer, an FeNi layer, etc. The second magnetic layer 12 is, for example, ferromagnetic. The second magnetic layer 12 includes, for example, a ferromagnetic metal.

The third conductive layer 23 is provided between the magnetic pole 30 and the second magnetic layer 12. The fourth conductive layer 24 is provided between the second magnetic layer 12 and the third shield region 33. The third conductive layer 23 and the fourth conductive layer 24 are, for example, nonmagnetic. The third conductive layer 23 and the fourth conductive layer 24 include, for example, nonmagnetic metals.

In one example, the third conductive layer 23 contacts the magnetic pole 30 and the second magnetic layer 12. In one example, the fourth conductive layer 24 contacts the second magnetic layer 12 and the third shield region 33.

For example, the thickness of the first magnetic layer 11 along the direction (the second direction D2) from the magnetic pole 30 toward the second shield region 32 is taken as a thickness t11. The thickness t11 is, for example, not less than 4 nm and not more than 20 nm.

The thickness of the first conductive layer 21 along the direction (the second direction D2) from the magnetic pole 30 toward the second shield region 32 is taken as a thickness t21. The thickness of the second conductive layer 22 along the second direction D2 is taken as a thickness t22. The thickness t21 and the thickness t22 each are, for example, not less than 0.3 nm and not more than 15 nm.

As described below, for example, the magnetization of the first magnetic layer 11 is set to the desired orientation easily by using such thicknesses.

For example, the thickness of the second magnetic layer 12 along the direction (the third direction D3) from the magnetic pole 30 toward the third shield region 33 is taken as a thickness t12. The thickness t12 is, for example, not less than 4 nm and not more than 20 nm.

The thickness of the third conductive layer 23 along the direction (the third direction D3) from the magnetic pole 30 toward the third shield region 33 is taken as a thickness t23. The thickness of the fourth conductive layer 24 along the third direction D3 is taken as a thickness t24. The thickness t23 and the thickness t24 each are, for example, not less than 0.3 nm and not more than 15 nm.

As described below, for example, the magnetization of the second magnetic layer 12 is set to the desired orientation easily by using such thicknesses.

As shown in FIG. 2, first to third terminals T1 to T3 are provided in one example. The first terminal T1 is electrically connected to the magnetic pole 30. The second terminal T2 is electrically connected to the second shield region 32. The third terminal T3 is electrically connected to the third shield region 33. The second terminal T2 may be electrically connected to at least one of the second shield region 32 or the third shield region 33. The third terminal T3 may be omitted in the case where the second terminal T2 is electrically connected to the second shield region 32 and the third shield region 33.

For example, first to third interconnects W1 to W3 may be provided. The first interconnect W1 is electrically connected to the first terminal T1. The second interconnect W2 is electrically connected to the second terminal T2. The third interconnect W3 is electrically connected to the third terminal T3.

For example, the first to third interconnects W1 to W3 are electrically connected to a first electrical circuit 20D. The first electrical circuit 20D is configured to supply a first current i1 to the first stacked body SB1. The first electrical circuit 20D is configured to supply a second current i2 to the second stacked body SB2.

For example, the first current i1 is supplied to the first stacked body SB1 via the second shield region 32 and the magnetic pole 30. The first current i1 flows through the first conductive layer 21, the first magnetic layer 11, and the second conductive layer 22. The orientation of the first current i1 is described below.

For example, the second current i2 is supplied to the second stacked body SB2 via the magnetic pole 30 and the third shield region 33. The second current i2 flows through the third conductive layer 23, the second magnetic layer 12, and the fourth conductive layer 24. The orientation of the second current i2 is described below.

The first current i1 and the second current i2 have direct current components. These currents are, for example, direct currents.

For example, the material of the first conductive layer 21 may be different from the material of the second conductive layer 22. For example, the material of the third conductive layer 23 may be different from the material of the fourth conductive layer 24.

The orientation of the magnetization of the magnetic layer (at least one of the first magnetic layer 11 or the second magnetic layer 12) included in such a stacked body (at least one of the first stacked body SB1 or the second stacked body SB2) can be controlled by a current flowing in the stacked body. For example, the magnetization of the magnetic layer changes to have a component having the reverse orientation of the orientation of the magnetic field emitted from the magnetic pole 30. The distribution of the orientation of the magnetic field emitted from the magnetic pole 30 can be controlled appropriately thereby.

It is favorable for the first terminal T1 and the second terminal T2 not to have an electrical connection other than via the first stacked body SB1. It is favorable for the first terminal T1 and the third terminal T3 not to have an electrical connection other than via the second stacked body SB2.

Figure 3:
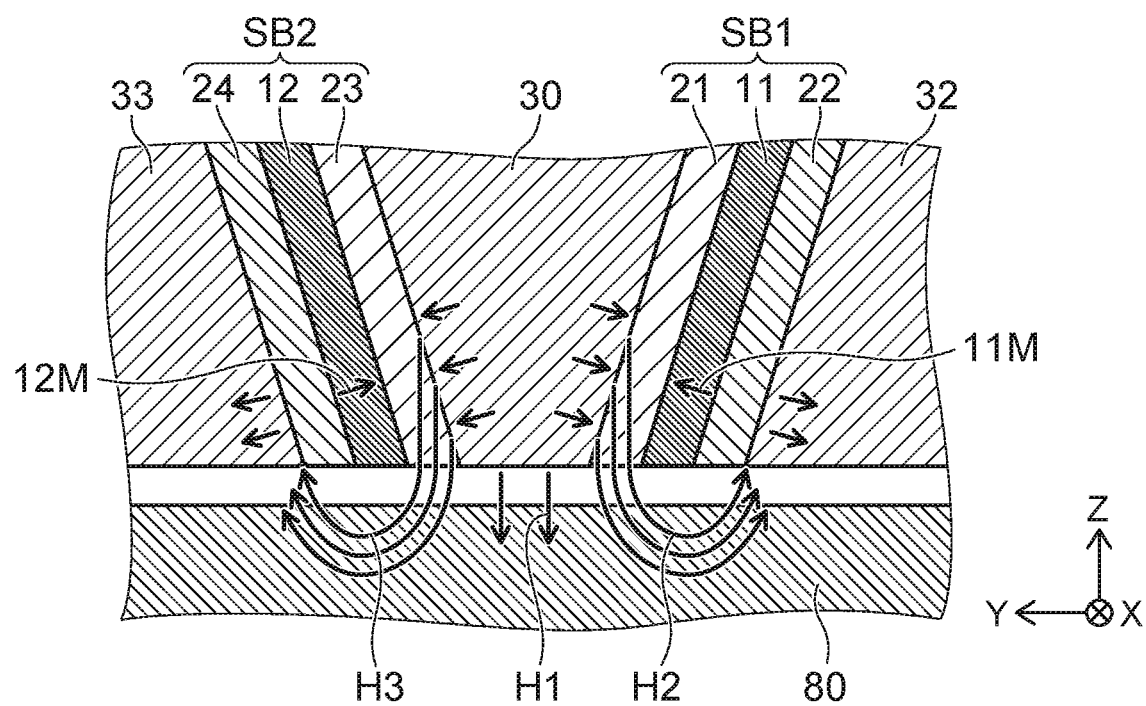
FIG. 3 is a schematic view illustrating operations of the magnetic head according to the first embodiment.

FIG. 3 is a schematic view illustrating operations of the magnetic head according to the first embodiment.

A magnetic field is generated from the magnetic pole 30 by causing the recording current to flow in the coil 30c. A portion (a magnetic field H1) of the magnetic field emitted from the magnetic pole 30 is oriented toward the magnetic recording medium 80. On the other hand, another portion (a magnetic field H2) of the magnetic field emitted from the magnetic pole 30 has a component toward the second shield region 32. By causing a current (the first current i1) to flow in the first stacked body SB1 at this time, a magnetization 11M of the first magnetic layer 11 is caused to have a component having the reverse orientation of the magnetic field H2. Thereby, it is difficult for the magnetic field H2 to pass through the first magnetic layer 11. As a result, the magnetic field H2 is oriented easily toward the magnetic recording medium 80. Thereby, the strength of the recording magnetic field can be changed steeply at the end portion in the cross-track direction (the end portion on the second shield region 32 side).

Similarly, another portion (a magnetic field H3) of the magnetic field emitted from the magnetic pole 30 has a component toward the third shield region 33. By causing a current (the second current i2) to flow in the second stacked body SB2, a magnetization 12M of the second magnetic layer 12 is caused to have a component having the reverse orientation of the magnetic field H3. Thereby, it is difficult for the magnetic field H3 to pass through the second magnetic layer 12. As a result, the magnetic field H3 is oriented easily toward the magnetic recording medium 80. Thereby, the strength of the recording magnetic field can be changed steeply at the end portion in the cross-track direction (the end portion on the third shield region 33 side).

In the embodiment, for example, the distribution of the recording magnetic field in the cross-track direction can be controlled. For example, the steepness of the recording magnetic field at the end portion can be improved. Thereby, for example, good recording and reproducing characteristics are obtained even when the spacing in the cross-track direction of multiple tracks is reduced.

According to the embodiment, a magnetic head and a magnetic recording and reproducing device can be provided in which the recording density can be increased.

For example, there are cases where shingle recording is performed. In shingle recording, a first track is recorded; and a second track is recorded by being overlaid on a portion of the first track. Shingle recording can be performed better because the distribution of the recording magnetic field in the cross-track direction can be controlled well.

In the embodiment, by providing the first stacked body SB1, the distribution of the recording magnetic field on the second shield region 32 side can be controlled. By providing the second stacked body SB2, the distribution of the recording magnetic field on the third shield region 33 side can be controlled. One of the first stacked body SB1 or the second stacked body SB2 may be provided in the embodiment.

In one example, the first conductive layer 21 includes at least one selected from the group consisting of Cu, Ag, Al, and Au. In such a case, it is favorable for the second conductive layer 22 to include, for example, at least one selected from the group consisting of Ta, Pt, W, Ru, Mo, Ir, Rh, and Pd. In such a case, the first current i1 that has the orientation from the first conductive layer 21 toward the second conductive layer 22 is conductible. In such a case, the magnetization 11M of the first magnetic layer 11 is caused to have a reverse component of the magnetic field emitted from the magnetic pole 30.

In another example, the first conductive layer 21 includes at least one selected from the group consisting of Ta, Pt, W, Ru, Mo, Ir, Rh, and Pd. In such a case, it is favorable for the second conductive layer 22 to include, for example, at least one selected from the group consisting of Cu, Ag, Al, and Au. In such a case, the first current i1 that has the orientation from the second conductive layer 22 toward the first conductive layer 21 is conductible. In such a case, the magnetization 11M of the first magnetic layer 11 is caused to have a reverse component of the magnetic field emitted from the magnetic pole 30.

The electrical resistance of the first stacked body SB1 in the state in which the magnetization 11M of the first magnetic layer 11 has the reverse component of the magnetic field emitted from the magnetic pole 30 due to the first current i1 may be different from the electrical resistance when the first current i1 does not flow.

For example, the electrical resistance between the magnetic pole 30 and the second shield region 32 when the first current i1 is caused to flow between the magnetic pole 30 and the second shield region 32 is taken as a first electrical resistance. The electrical resistance between the magnetic pole 30 and the second shield region 32 when a third current is caused to flow between the magnetic pole 30 and the second shield region 32 is taken as a second electrical resistance. The first electrical resistance is different from the second electrical resistance. The orientation of the third current is the reverse of the orientation of the first current i1.

For example, the magnetization 11M of the first magnetic layer 11 reverses with respect to the magnetic field from the magnetic pole 30 due to the first current i1. For example, when the third current recited above flows, the magnetization 11M of the first magnetic layer 11 does not reverse with respect to the magnetic field from the magnetic pole 30. In one example, the first electrical resistance is higher than the second electrical resistance.

For example, the electrical resistance between the magnetic pole 30 and the third shield region 33 when the second current i2 is caused to flow between the magnetic pole 30 and the third shield region 33 is taken as a third electrical resistance. The electrical resistance between the magnetic pole 30 and the third shield region 33 when a fourth current is caused to flow between the magnetic pole 30 and the third shield region 33 is taken as a fourth electrical resistance. The fourth electrical resistance is different from the third electrical resistance. The orientation of the fourth current is the reverse of the orientation of the second current i2.

For example, the magnetization 12M of the second magnetic layer 12 reverses with respect to the magnetic field from the magnetic pole 30 due to the second current i2. For example, the magnetization 12M of the second magnetic layer 12 does not reverse with respect to the magnetic field from the magnetic pole 30 when the fourth current recited above flows. In one example, the third electrical resistance is higher than the fourth electrical resistance.

For example, the electrical resistance difference recited above is based on a magnetoresistance effect.

In one example, the first conductive layer 21 includes at least one selected from the group consisting of Cu, Ag, Al, and Au. In such a case, it is favorable for the second conductive layer 22 to include at least one selected from the group consisting of Ta, Pt, W, Ru, Mo, Ir, Rh, and Pd. In such a case, the third conductive layer 23 includes at least one selected from the group consisting of Cu, Ag, Al, and Au. In such a case, it is favorable for the fourth conductive layer 24 to include at least one selected from the group consisting of Ta, Pt, W, Ru, Mo, Ir, Rh, and Pd. In such a case, the first current i1 that has the orientation from the first conductive layer 21 toward the second conductive layer 22 is conductible. In such a case, the second current i2 that has the orientation from the third conductive layer 23 toward the fourth conductive layer 24 is conductible.

In one example, the second conductive layer 22 includes at least one selected from the group consisting of Cu, Ag, Al, and Au. In such a case, it is favorable for the first conductive layer 21 to include at least one selected from the group consisting of Ta, Pt, W, Ru, Mo, Ir, Rh, and Pd. In such a case, the fourth conductive layer 24 includes at least one selected from the group consisting of Cu, Ag, Al, and Au. In such a case, it is favorable for the third conductive layer 23 to include at least one selected from the group consisting of Ta, Pt, W, Ru, Mo, Ir, Rh, and Pd. In such a case, the first current i1 that has the orientation from the second conductive layer 22 toward the first conductive layer 21 is conductible. In such a case, the second current i2 that has the orientation from the fourth conductive layer 24 toward the third conductive layer 23 is conductible.

By using mutually-different conductive materials as the first conductive layer 21 and the second conductive layer 22, the magnetization 11M of the first magnetic layer 11 can be reversed easily. By using mutually-different conductive materials as the third conductive layer 23 and the fourth conductive layer 24, the magnetization 12M of the second magnetic layer 12 can be reversed easily.

An example of simulation results of a characteristic of the magnetic head will now be described. In a first model of the simulation, a height HT along the Z-axis direction of the first magnetic layer 11 (referring to FIG. 2) is 40 nm. A length L1 of the first magnetic layer 11 (referring to FIG. 1B) is 60 nm. As shown in FIG. 1B, the length L1 is the length of the first magnetic layer 11 in a direction along a plane including the first surface 30F. The length L1 is the length of the first magnetic layer 11 in a direction perpendicular to the direction from the magnetic pole 30 toward the second shield region 32. The height along the Z-axis direction of the second magnetic layer 12 is the same as the height HT of the first magnetic layer 11. The length of the second magnetic layer 12 is the same as the length L1 of the first magnetic layer 11. The first magnetic layer 11 and the second magnetic layer 12 are provided at symmetric positions with respect to an axis along the X-axis direction passing through the Y-axis direction center of the magnetic pole 30 (referring to FIG. 1B).

A parameter for the case where an FeNi alloy is included in the first magnetic layer 11 and the second magnetic layer 12 is applied. The saturation magnetizations of the first magnetic layer 11 and the second magnetic layer 12 are 1 T (tesla).

The thickness t11 and the thickness t12 (referring to FIG. 1B) each are 10 nm. The thickness t21 and the thickness t23 (referring to FIG. 1B) each are 15 nm. The thickness t22 and the thickness t24 (referring to FIG. 1B) each are 15 nm. The distance between the magnetic pole 30 and the second shield region 32 and the distance between the magnetic pole 30 and the third shield region 33 each are 40 nm. In the first model, the first current i1 (referring to FIG. 2) flows in the first stacked body SB1. The second current i2 (referring to FIG. 2) flows in the second stacked body SB2.

In a second model, the first stacked body SB1 and the second stacked body SB2 are not provided. An insulating layer (having the same material as the insulating portion 30i) is provided in the second model in the region between the magnetic pole 30 and the second shield region 32 and the region between the magnetic pole 30 and the third shield region 33. In the second model, the distance between the magnetic pole 30 and the second shield region 32 and the distance between the magnetic pole 30 and the third shield region 33 each are 40 nm.

A third model has the same configuration as the first model. In the third model, currents are not supplied to the first stacked body SB1 and the second stacked body SB2.

Figure 4:
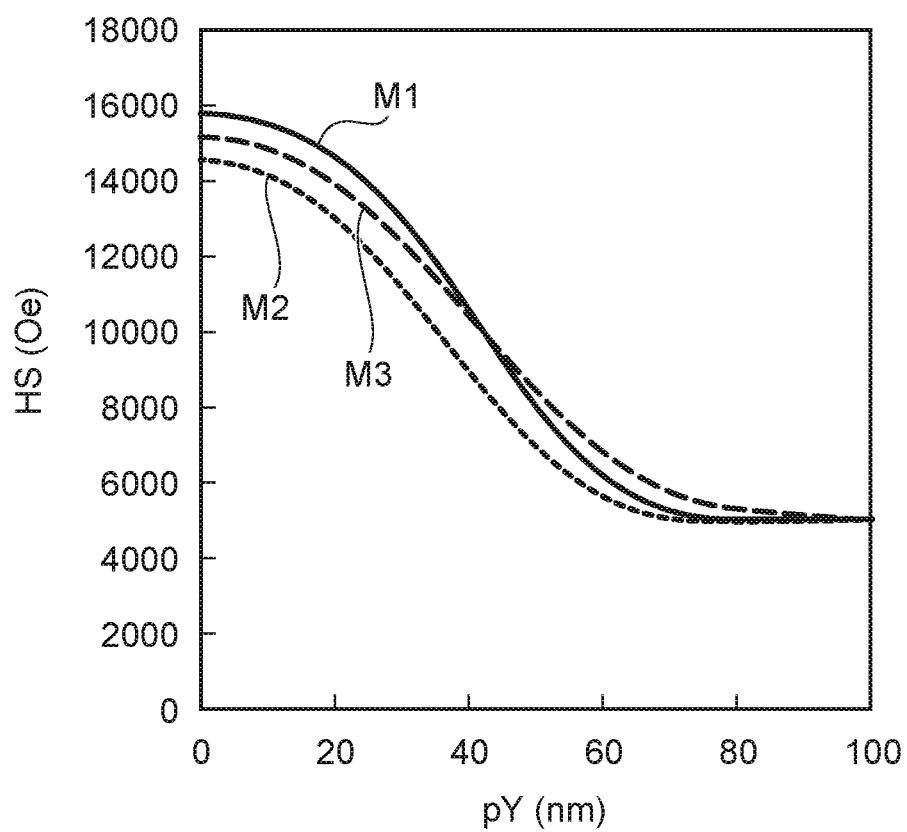
FIG. 4 is a graph illustrating characteristics of the magnetic head.

FIG. 4 is a graph illustrating characteristics of the magnetic head.

FIG. 4 illustrates the simulation results of the characteristics of first to third models M1 to M3 recited above. The horizontal axis of FIG. 4 is a position pY (nm) in the cross-track direction (the Y-axis direction). The position where the position pY is 0 nm corresponds to the center of the magnetic pole 30. The vertical axis of FIG. 4 is a magnetic field strength HS (Oe) applied from the magnetic pole 30 to the magnetic recording medium 80. The magnetic field strength HS is the maximum magnetic field strength in the down-track direction (the X-axis direction) at the position pY.

FIG. 4 corresponds to an "off-track profile." In the off-track profile, it is favorable for the magnetic field strength HS in the position pY-direction to change (e.g., attenuate) steeply. A high recording density is obtained by changing the magnetic field strength HS steeply.

As shown in FIG. 4, compared to the second model M2, the maximum value of the magnetic field strength HS is higher for the third model M3. However, compared to the second model M2, the steepness of the attenuation of the magnetic field strength HS is lower for the third model M3. It is considered that this is caused by the magnetization saturating at the side shields (the second shield region 32 and the third shield region 33) in the third model M3.

Conversely, compared to the second model M2 and the third model M3, the maximum value of the magnetic field strength HS is higher for the first model M1. Further, compared to the second model M2 and the third model M3, the steepness of the attenuation of the magnetic field strength HS is high for the first model M1. A high recording density is obtained for the first model M1. In the first model M1, a current flows in the first stacked body SB1 and the second stacked body SB2. Thereby, the magnetization 11M of the first magnetic layer 11 and the magnetization 12M of the second magnetic layer 12 reverse. It is considered that the steepness of the attenuation of the magnetic field strength HS is high thereby.

For example, in FIG. 4, an off-track magnetic field gradient (Oe/nm) can be calculated from the magnetic field strength HS at the position pY of 40 nm and the magnetic field strength HS at the position pY of 0 nm. The off-track magnetic field gradient (Oe/nm) can be normalized using the maximum value of the magnetic field strength HS for the first to third models M1 to M3. The normalized off-track magnetic field gradients (1/nm) can be derived for the first to third models M1 to M3. The normalized off-track magnetic field gradients are negative. A large absolute value of the normalized off-track magnetic field gradient corresponds to a high steepness. It is favorable for the absolute value of the off-track magnetic field gradient to be large.

For the first model M1, the normalized off-track magnetic field gradient is $-1.82 \times 10^{-2}$/nm. In the second model M2, the normalized off-track magnetic field gradient is $-1.4 \times 10^{-2}$/nm. In the third model M3, the normalized off-track magnetic field gradient is $-1.1 \times 10^{-2}$/nm.

An example of the characteristic when the height HT along the Z-axis direction of the first magnetic layer 11 (referring to FIG. 2) is modified for the first model M1 will now be described. Here, the height along the Z-axis direction of the second magnetic layer 12 is modified in conjunction with the height HT of the first magnetic layer 11. The normalized off-track magnetic field gradient is about $-1.8 \times 10^{-2}$/nm when the height HT is 20 nm, 40 nm, 60 nm, and 80 nm. The normalized off-track magnetic field gradient is substantially independent of the height HT.

An example of the characteristic when the length L1 of the first magnetic layer 11 (referring to FIG. 1B) is modified for the first model M1 will now be described. Here, the length of the second magnetic layer 12 is modified in conjunction with the length L1 of the first magnetic layer 11. As described above, the normalized off-track magnetic field gradient is about $-1.8 \times 10^{-2}$/nm when the length L1 is 60 nm. The normalized off-track magnetic field gradient is about $-1.78 \times 10^{-2}$/nm when the length L1 is 50 nm. The normalized off-track magnetic field gradient is about $-1.7 \times 10^{-2}$/nm when the length L1 is 40 nm. The normalized off-track magnetic field gradient is about $-1.6 \times 10^{-2}$/nm when the length L1 is 30 nm. The normalized off-track magnetic field gradient is about $-1.49 \times 10^{-2}$/nm when the length L1 is 20 nm. The absolute value of the normalized off-track magnetic field gradient increases as the length L1 increases. In the embodiment, it is favorable for the length L1 to be, for example, 30 nm or more.

An example of operations of the magnetic head 110 according to the embodiment will now be described. The first stacked body SB1 will be described. The description recited below is applicable to the second stacked body SB2 by replacing the first stacked body SB1 with the second stacked body SB2 and by replacing the second shield region 32 with the third shield region 33.

Figure 5:
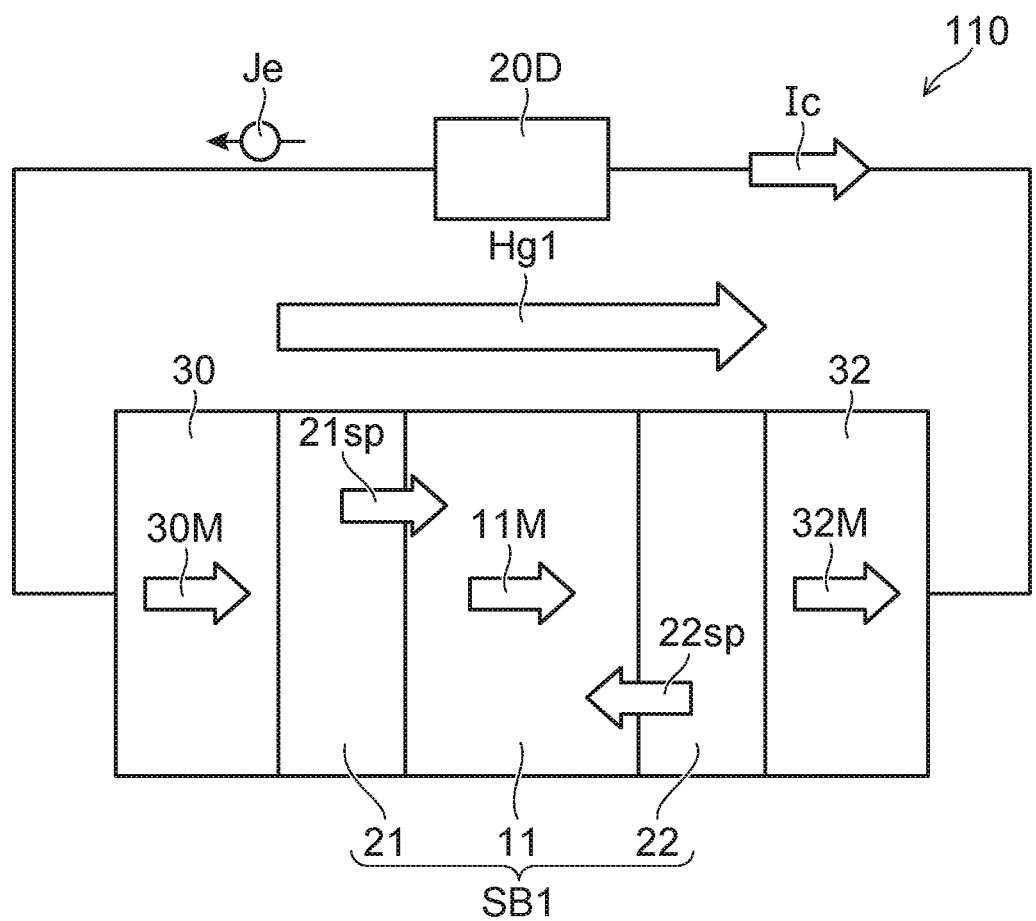
FIG. 5 is a schematic view illustrating the operations of the magnetic head according to the embodiment.

FIG. 5 is a schematic view illustrating the operations of the magnetic head according to the embodiment.

As shown in FIG. 5, the first stacked body SB1 is provided between the magnetic pole 30 and the second shield region 32. The first magnetic layer 11, the first conductive layer 21, and the second conductive layer 22 are provided in the first stacked body SB1.

The recording current is supplied to the coil 30c of the magnetic pole 30 from the second electrical circuit 30D (referring to FIG. 1A). Thereby, a gap magnetic field Hg1 is generated from the magnetic pole 30. The gap magnetic field Hg1 is applied to the first stacked body SB1.

For example, a magnetization 30M of the magnetic pole 30 and a magnetization 32M of the second shield region 32 are substantially parallel to the gap magnetic field Hg1. The magnetization 11M of the first magnetic layer 11 is substantially parallel to the gap magnetic field Hg1.

At this time, a current Ic (corresponding to the first current i1) is supplied from the first electrical circuit 20D to the first stacked body SB1. In the example, the current Ic is supplied to the first stacked body SB1 via the second shield region 32 and the magnetic pole 30. For example, the current Ic flows from the second conductive layer 22 toward the first conductive layer 21. At this time, an electron current Je flows. The electron current Je flows from the first conductive layer 21 toward the second conductive layer 22.

A spin torque $21sp$ is generated at the interface between the first conductive layer 21 and the first magnetic layer 11 by the electron current Je. The spin torque $21sp$ is transmissive. On the other hand, a spin torque $22sp$ is generated at the interface between the first magnetic layer 11 and the second conductive layer 22 by the electron current Je. The spin torque $22sp$ is reflective. The magnetization 11M of the first magnetic layer 11 reverses due to these spin torques. The reversed magnetization 11M has a component having the reverse orientation of the gap magnetic field Hg1.

For example, the current Ic may flow from the first conductive layer 21 toward the second conductive layer 22. At this time, the orientation of the spin torque $21sp$ and the orientation of the spin torque $22sp$ shown in FIG. 5 reverse. At this time, the spin torque $21sp$ is reflective; and the spin torque $22sp$ is transmissive.

For example, by appropriately controlling the spin torque $21sp$ and the spin torque $22sp$, the magnetization 11M of the first magnetic layer 11 reverses easily. These spin torques can be controlled appropriately using the examples of the materials described above in reference to the first conductive layer 21 and the second conductive layer 22.

Second Embodiment

A second embodiment relates to a magnetic recording and reproducing device. The magnetic recording and reproducing device includes, for example, the magnetic head 110 described in reference to the first embodiment (and the magnetic heads of the modifications of the magnetic head 110). The magnetic recording and reproducing device further includes the magnetic recording medium 80, and the first electrical circuit 20D that is configured to supply a current (the first current i1) to the first stacked body SB1. In the case where the magnetic head 110 includes the second stacked body SB2, the first electrical circuit 20D may supply a current (the second current i2) to the second stacked body SB2 as well.

An example of the magnetic recording and reproducing device according to the embodiment will now be described.

Figure 6:
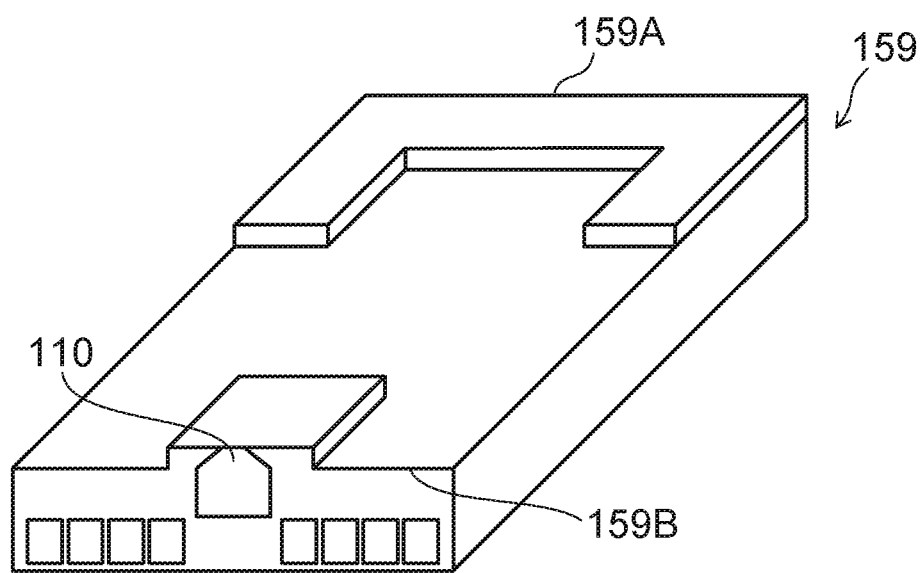
FIG. 6 is a schematic perspective view illustrating a portion of the magnetic recording and reproducing device according to the embodiment.

FIG. 6 is a schematic perspective view illustrating a portion of the magnetic recording and reproducing device according to the embodiment.

FIG. 6 illustrates a head slider.

The magnetic head 110 is provided in the head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 7:
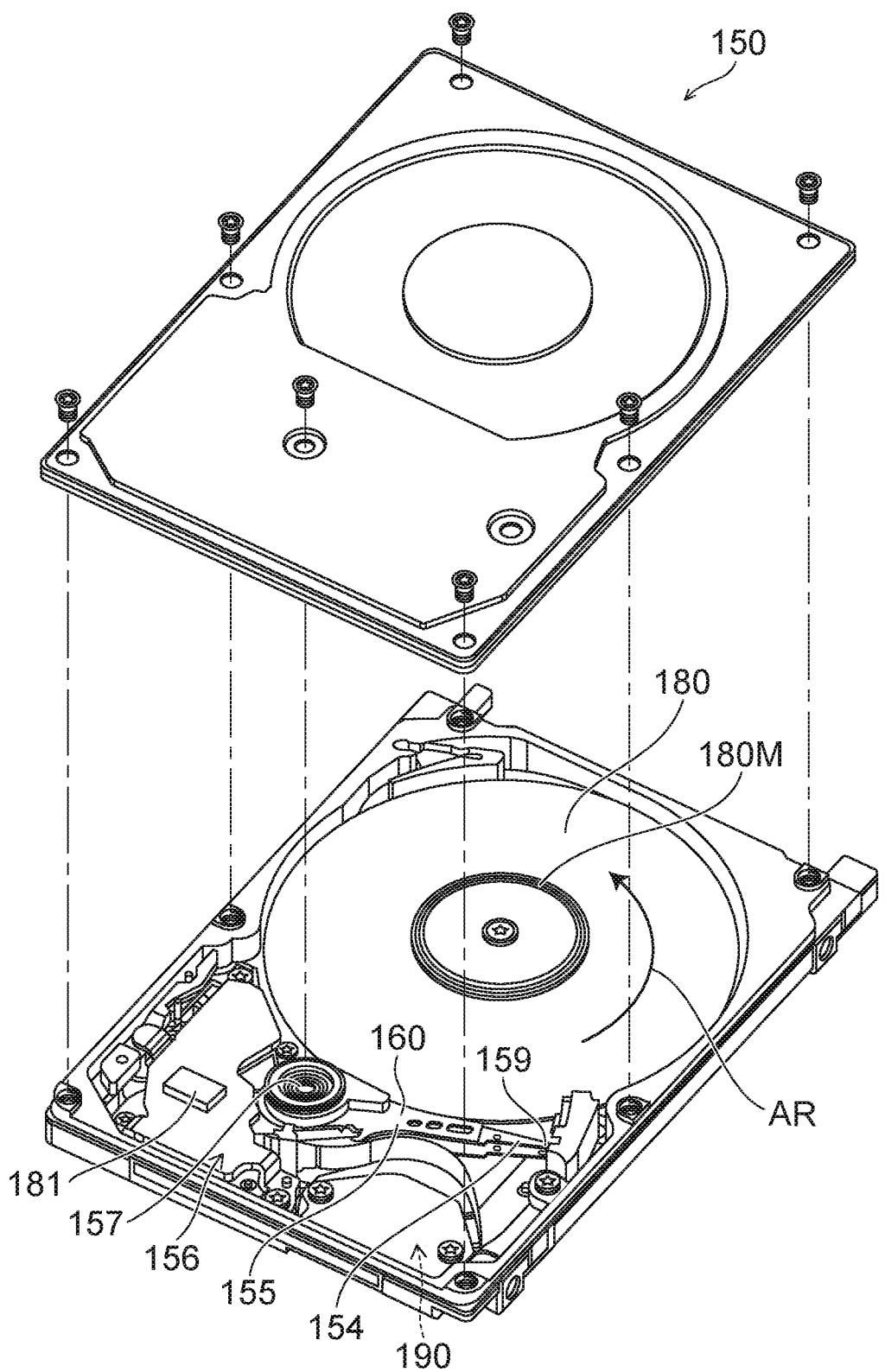
FIG. 7 is a schematic perspective view illustrating the magnetic recording and reproducing device according to the embodiment.

FIG. 7 is a schematic perspective view illustrating the magnetic recording and reproducing device according to the embodiment.

Figure 8A:
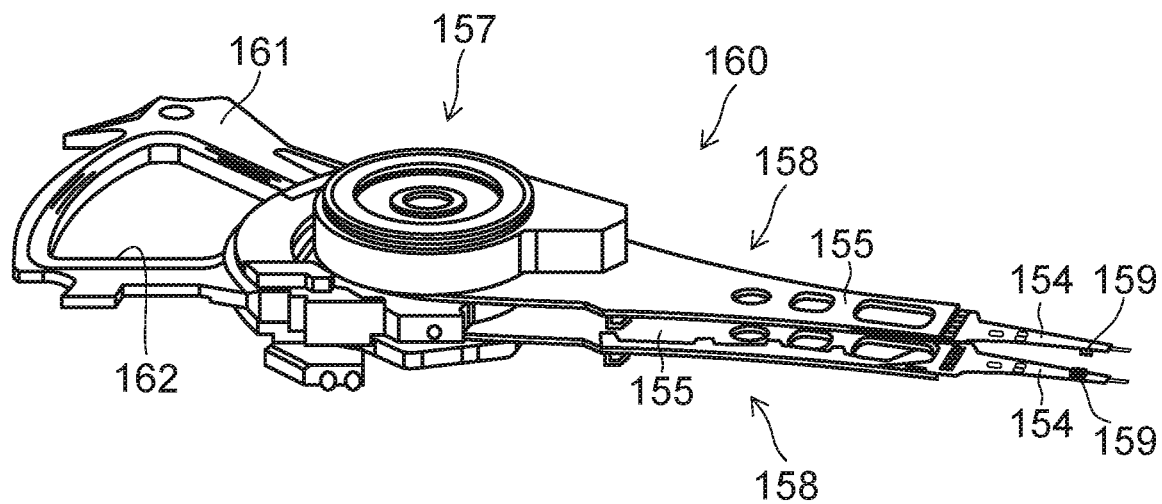
FIG. 8A and FIG. 8B are schematic perspective views illustrating a portion of the magnetic recording and reproducing device according to the embodiment.
Figure 8B:
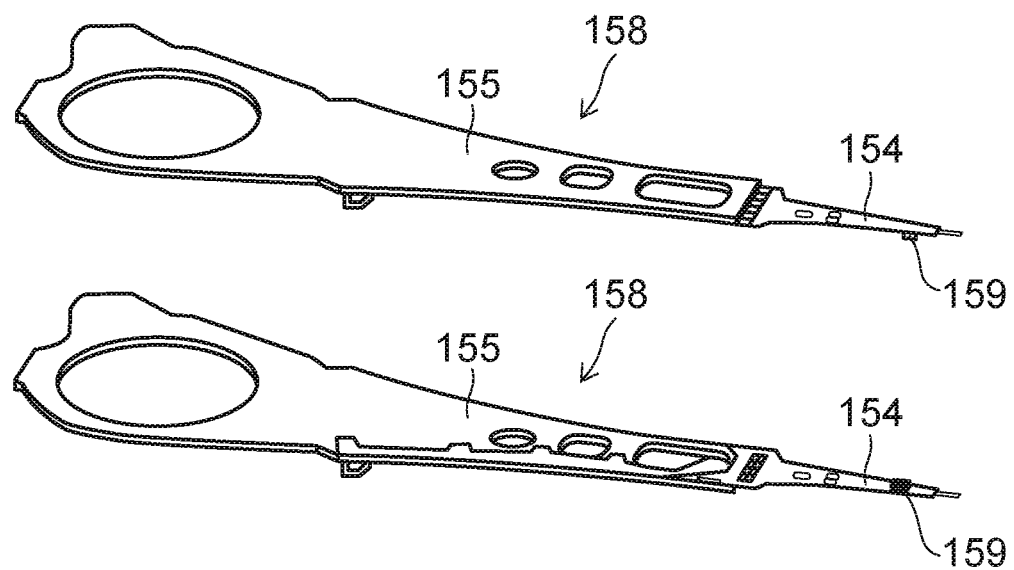

FIG. 8A and FIG. 8B are schematic perspective views illustrating a portion of the magnetic recording and reproducing device according to the embodiment.

As shown in FIG. 7, a rotary actuator is used in the magnetic recording and reproducing device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording and reproducing device 150 according to the embodiment may include multiple recording medium disks 180. The magnetic recording and reproducing device 150 may include a recording medium 181. The recording medium 181 is, for example, a SSD (Solid State Drive). The recording medium 181 includes, for example, nonvolatile memory such as flash memory, etc. For example, the magnetic recording and reproducing device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-opposing surface (the ABS) of the head slider 159 are balanced. The distance between the medium-opposing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, the drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 8A illustrates the configuration of a portion of the magnetic recording and reproducing device and is an enlarged perspective view of a head stack assembly 160.

FIG. 8B is a perspective view illustrating a magnetic head assembly (a head gimbal assembly (HGA)) 158 that is a portion of the head stack assembly 160.

As shown in FIG. 8A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 8B, the head gimbal assembly 158 includes the arm 155 extending from the bearing part 157 and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording and reproducing device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording and reproducing device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The magnetic recording and reproducing device 150 according to the embodiment includes a magnetic recording medium, the magnetic head assembly according to the embodiment, and a signal processor that records and reproduces the signals to and from the magnetic recording medium by using a magnetic head provided in the magnetic head assembly.

The embodiments include, for example, the following configurations (e.g., technological proposals).

Configuration 1

A magnetic head, comprising:
a magnetic pole;
a first shield region, a direction from the magnetic pole toward the first shield region being aligned with a first direction;
a second shield region, a direction from the magnetic pole toward the second shield region crossing the first direction; and
a first stacked body provided between the magnetic pole and the second shield region,
the first stacked body including
a first magnetic layer including at least one selected from the group consisting of Fe, Co, and Ni,
a first conductive layer provided between the magnetic pole and the first magnetic layer, and
a second conductive layer provided between the first magnetic layer and the second shield region,
the first direction being aligned with a direction of relative movement between the magnetic pole and a magnetic recording medium, the magnetic pole opposing the magnetic recording medium.

Configuration 2

A magnetic head, comprising:
a magnetic pole;
a first shield region, a direction from the magnetic pole toward the first shield region being aligned with a first direction;
a second shield region, a direction from the magnetic pole toward the second shield region crossing the first direction; and
a first stacked body provided between the magnetic pole and the second shield region,
the first stacked body including
a first magnetic layer including at least one selected from the group consisting of Fe, Co, and Ni,
a first conductive layer contacting the magnetic pole and the first magnetic layer and being provided between the magnetic pole and the first magnetic layer, and
a second conductive layer contacting the first magnetic layer and the second shield region and being provided between the first magnetic layer and the second shield region.

Configuration 3

The magnetic head according to Configuration 1 or 2, further comprising:
a first terminal electrically connected to the magnetic pole; and
a second terminal electrically connected to the second shield region.

Configuration 4

The magnetic head according to any one of Configurations 1 to 3, wherein
the first conductive layer includes at least one selected from the group consisting of Cu, Ag, Al, and Au,
the second conductive layer includes at least one selected from the group consisting of Ta, Pt, W, Ru, Mo, Ir, Rh, and Pd, and
a first current having an orientation from the first conductive layer toward the second conductive layer is conductible.

Configuration 5

The magnetic head according to any one of Configurations 1 to 3, wherein
the first conductive layer includes at least one selected from the group consisting of Ta, Pt, W, Ru, Mo, Ir, Rh, and Pd,
the second conductive layer includes at least one selected from the group consisting of Cu, Ag, Al, and Au, and a first current having an orientation from the second conductive layer toward the first conductive layer is conductible.

Configuration 6

The magnetic head according to Configuration 4 or 5, wherein a first electrical resistance between the magnetic pole and the second shield region when the first current is caused to flow between the magnetic pole and the second shield region is different from a second electrical resistance between the magnetic pole and the second shield region when an other current is caused to flow between the magnetic pole and the second shield region, an orientation of the other current being the reverse of an orientation of the first current.

Configuration 7

The magnetic head according to any one of Configurations 1 to 6, wherein a thickness of the first magnetic layer along the direction from the magnetic pole toward the second shield region is not less than 4 nm and not more than 20 nm.

Configuration 8

The magnetic head according to any one of Configurations 1 to 7, wherein a thickness of the first conductive layer along the direction from the magnetic pole toward the second shield region and a thickness of the second conductive layer along the direction from the magnetic pole toward the second shield region each are not less than 0.3 nm and not more than 15 nm.

Configuration 9

A magnetic head, comprising:
a magnetic pole;
a first shield region;
a second shield region;
a third shield region, a direction from the third shield region toward the second shield region crossing a first direction from the magnetic pole toward the first shield region, at least a portion of the magnetic pole being provided between the third shield region and the second shield region in the direction from the third shield region toward the second shield region;
a first stacked body provided between the magnetic pole and the second shield region; and
a second stacked body provided between the magnetic pole and the third shield region,
the first stacked body including
a first magnetic layer including at least one selected from the group consisting of Fe, Co, and Ni,
a first conductive layer provided between the magnetic pole and the first magnetic layer, and
a second conductive layer provided between the first magnetic layer and the second shield region,
the second stacked body including
a second magnetic layer including at least one selected from the group consisting of Fe, Co, and Ni,
a third conductive layer provided between the magnetic pole and the second magnetic layer, and
a fourth conductive layer provided between the second magnetic layer and the third shield region.

Configuration 10

The magnetic head according to Configuration 9, further comprising:
a first terminal electrically connected to the magnetic pole; and
a second terminal electrically connected to at least one of the second shield region or the third shield region.

Configuration 11

The magnetic head according to Configuration 9 or 10, wherein
the first conductive layer includes at least one selected from the group consisting of Cu, Ag, Al, and Au,
the second conductive layer includes at least one selected from the group consisting of Ta, Pt, W, Ru, Mo, Ir, Rh, and Pd,
the third conductive layer includes at least one selected from the group consisting of Cu, Ag, Al, and Au, and
the fourth conductive layer includes at least one selected from the group consisting of Ta, Pt, W, Ru, Mo, Ir, Rh, and Pd.

Configuration 12

The magnetic head according to Configuration 9 or 10, wherein
the first conductive layer includes at least one selected from the group consisting of Ta, Pt, W, Ru, Mo, Ir, Rh, and Pd,
the second conductive layer includes at least one selected from the group consisting of Cu, Ag, Al, and Au,
the third conductive layer includes at least one selected from the group consisting of Ta, Pt, W, Ru, Mo, Ir, Rh, and Pd, and
the fourth conductive layer includes at least one selected from the group consisting of Cu, Ag, Al, and Au.

Configuration 13

The magnetic head according to Configuration 11, wherein
a first current having an orientation from the first conductive layer toward the second conductive layer is conductible, and
a second current having an orientation from the third conductive layer toward the fourth conductive layer is conductible.

Configuration 14

The magnetic head according to Configuration 11, wherein
a first current having an orientation from the second conductive layer toward the first conductive layer is conductible, and
a second current having an orientation from the fourth conductive layer toward the third conductive layer is conductible.

Configuration 15

The magnetic head according to Configuration 13 or 14, wherein a first electrical resistance between the magnetic pole and the second shield region when the first current is caused to flow between the magnetic pole and the second shield region is different from a second electrical resistance between the magnetic pole and the second shield region when a third current is caused to flow between the magnetic pole and the second shield region, an orientation of the third current being the reverse of the orientation of the first current.

Configuration 16

The magnetic head according to any one of Configurations 13 to 15, wherein a third electrical resistance between the magnetic pole and the third shield region when the second current is caused to flow between the magnetic pole and the third shield region is different from a fourth electrical resistance between the magnetic pole and the third shield region when a fourth current is caused to flow between the magnetic pole and the third shield region, an orientation of the fourth current being the reverse of the orientation of the second current.

Configuration 17

The magnetic head according to any one of Configurations 9 to 16, wherein
the first conductive layer contacts the magnetic pole and the first magnetic layer,
the second conductive layer contacts the first magnetic layer and the second shield region,
the third conductive layer contacts the magnetic pole and the second magnetic layer, and
the fourth conductive layer contacts the second magnetic layer and the third shield region.

Configuration 18

The magnetic head according to any one of Configurations 9 to 17, wherein a thickness of the first magnetic layer along a direction from the magnetic pole toward the second shield region is not less than 4 nm and not more than 20 nm.

Configuration 19

The magnetic head according to any one of Configurations 9 to 18, wherein a thickness of the first conductive layer along a direction from the magnetic pole toward the second shield region and a thickness of the second conductive layer along the direction from the magnetic pole toward the second shield region each are not less than 0.3 nm and not more than 15 nm.

Configuration 20

The magnetic head according to any one of Configurations 9 to 19, wherein a thickness of the third conductive layer along a direction from the magnetic pole toward the third shield region and a thickness of the fourth conductive layer along the direction from the magnetic pole toward the third shield region each are not less than 0.3 nm and not more than 15 nm.

Configuration 21

A magnetic recording and reproducing device, comprising:
the magnetic head according to Configuration 1;
the magnetic recording medium; and
a first electrical circuit configured to supply a current to the first stacked body.

Configuration 22

A magnetic recording and reproducing device, comprising: the magnetic head according to any one of Configurations 9 to 20;
a magnetic recording medium, information being recorded in the magnetic recording medium by the magnetic head; and
a first electrical circuit configured to supply a current to the first stacked body.

According to the embodiments, a magnetic head and a magnetic recording and reproducing device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, shield regions, stacked bodies, magnetic layers, conductive layers, interconnects, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording and reproducing devices practicable by an appropriate design modification by one skilled in the art based on the magnetic heads, and the magnetic recording and reproducing devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
a magnetic pole;
a first shield region;
a second shield region;
a third shield region, a second direction from the third shield region toward the second shield region crossing a first direction from the magnetic pole toward the first shield region, at least a portion of the magnetic pole being provided between the third shield region and the second shield region in the second direction, a third direction from the third shield region toward the magnetic pole crossing the first direction;

a first stacked body provided between the magnetic pole and the second shield region;

a second stacked body provided between the magnetic pole and the third shield region; and an insulating portion including a first part and a second part, the first part being provided between the magnetic pole and the second shield region in the second direction, and provided between the first stacked body and the first shield region in the first direction, a direction from the first stacked body toward the first part crossing the second direction, the second part being provided between the magnetic pole and the third shield region in the third direction, and provided between the second stacked body and the first shield region in the first direction, a direction from the second stacked body toward the second part crossing the third direction, the first stacked body including
  a first magnetic layer including at least one selected from the group consisting of Fe, Co, and Ni,
  a first conductive layer provided between the magnetic pole and the first magnetic layer, and
  a second conductive layer provided between the first magnetic layer and the second shield region, the second stacked body including
  a second magnetic layer including at least one selected from the group consisting of Fe, Co, and Ni,
  a third conductive layer provided between the magnetic pole and the second magnetic layer, and
  a fourth conductive layer provided between the second magnetic layer and the third shield region, wherein a cross section of the magnetic pole, taken along a plane parallel to both the first direction and the second direction, is triangular, the first conductive layer contacts the magnetic pole and the first magnetic layer, the second conductive layer contacts the first magnetic layer and the second shield region, the third conductive layer contacts the magnetic pole and the second magnetic layer, and the fourth conductive layer contacts the second magnetic layer and the third shield region.

2. The head according to claim 1, further comprising:
a first terminal electrically connected to the magnetic pole; and
a second terminal electrically connected to at least one of the second shield region and the third shield region.

3. The head according to claim 1, wherein
the first conductive layer includes at least one selected from the group consisting of Ta, Pt, W, Ru, Mo, Ir, Rh, and Pd,
the second conductive layer includes at least one selected from the group consisting of Cu, Ag, Al, and Au,
the third conductive layer includes at least one selected from the group consisting of Ta, Pt, W, Ru, Mo, Ir, Rh, and Pd, and
the fourth conductive layer includes at least one selected from the group consisting of Cu, Ag, Al, and Au.

4. The head according to claim 1, wherein
the first conductive layer includes at least one selected from the group consisting of Cu, Ag, Al, and Au,
the second conductive layer includes at least one selected from the group consisting of Ta, Pt, W, Ru, Mo, Ir, Rh, and Pd,
the third conductive layer includes at least one selected from the group consisting of Cu, Ag, Al, and Au, and
the fourth conductive layer includes at least one selected from the group consisting of Ta, Pt, W, Ru, Mo, Ir, Rh, and Pd.

5. The head according to claim 4, wherein
a first current having an orientation from the second conductive layer toward the first conductive layer is conductible, and
a second current having an orientation from the fourth conductive layer toward the third conductive layer is conductible.

6. The head according to claim 4, wherein
a first current having an orientation from the first conductive layer toward the second conductive layer conductible, and
a second current having an orientation from the third conductive layer toward the fourth conductive layer conductible.

7. The head according to claim 6, wherein a first electrical resistance between the magnetic pole and the second shield region when the first current is caused to flow between the magnetic pole and the second shield region is different from a second electrical resistance between the magnetic pole and the second shield region when a third current is caused to flow between the magnetic pole and the second shield region, an orientation of the third current being the reverse of the orientation of the first current.

8. The head according to claim 6, wherein a third electrical resistance between the magnetic pole and the third shield region when the second current is caused to flow between the magnetic pole and the third shield region is different from a fourth electrical resistance between the magnetic pole and the third shield region when a fourth current is caused to flow between the magnetic pole and the third shield region, an orientation of the fourth current being the reverse of the orientation of the second current.

9. The head according to claim 1, wherein a thickness of the first magnetic layer along the second direction is not less than 4 nm and not more than 20 nm.

10. A magnetic recording and reproducing device, comprising:
the magnetic head according to claim 1;
a magnetic recording medium, information being recorded in the magnetic recording medium by the magnetic head; and
a first electrical circuit configured to supply a current to the first stacked body.

11. A magnetic head, comprising:
a magnetic pole;
a first shield region, a direction from the magnetic pole toward the first shield region being aligned with a first direction;
a second shield region, a second direction from the magnetic pole toward the second shield region crossing the first direction;
a first stacked body provided between the magnetic pole and the second shield region; and
an insulating portion, a part of the insulating portion being provided between the magnetic pole and the second shield region in the second direction, and provided between the first stacked body and the first shield region in the first direction, a direction from the first stacked body toward the part of the insulating portion crossing the second direction, the first stacked body including
- a first magnetic layer including at least one selected from the group consisting of Fe, Co, and Ni,
- a first conductive layer provided between the magnetic pole and the first magnetic layer, and
- a second conductive layer provided between the first magnetic layer and the second shield region, the first direction being aligned with a direction of relative movement between the magnetic pole and a magnetic recording medium, the magnetic pole opposing the magnetic recording medium, wherein a cross section of the magnetic pole, taken along a plane parallel to both of the first direction and second direction, is triangular, the first shield region is a trailing shield, a first length at a first position of the magnetic pole along a direction perpendicular to the first direction is greater than a second length at a second position of the magnetic pole along the direction perpendicular to the first direction, the first position is between the second position and the first shield region in the first direction.

12. A magnetic recording and reproducing device, comprising:
- the magnetic head according to claim 1;
- the magnetic recording medium; and
- a first electrical circuit configured to supply a current to the first stacked body.

13. A magnetic head, comprising:
- a magnetic pole;
- a first shield region;
- a second shield region;
- a third shield region, a second direction from the third shield region toward the second shield region crossing a first direction from the magnetic pole toward the first shield region, at least a portion of the magnetic pole being provided between the third shield region and the second shield region in the second direction, a third direction from the third shield region toward the magnetic pole crossing the first direction;
- a first stacked body provided between the magnetic pole and the second shield region;
- a second stacked body provided between the magnetic pole and the third shield region; and
- an insulating portion including a first part and a second part, the first part being provided between the magnetic pole and the second shield region in the second direction, and provided between the first stacked body and the first shield region in the first direction, a direction from the first stacked body toward the first part crossing the second direction, the second part being provided between the magnetic pole and the third shield region in the third direction, and provided between the second stacked body and the first shield region in the first direction, a direction from the second stacked body toward the second part crossing the third direction, the first stacked body including
- a first magnetic layer including at least one selected from the group consisting of Fe, Co, and Ni,
- a first conductive layer provided between the magnetic pole and the first magnetic layer, and
- a second conductive layer provided between the first magnetic layer and the second shield region, the second stacked body including
- a second magnetic layer including at least one selected from the group consisting of Fe, Co, and Ni,
- a third conductive layer provided between the magnetic pole and the second magnetic layer, and
- a fourth conductive layer provided between the second magnetic layer and the third shield region, wherein a cross section of the magnetic pole, taken along a plane parallel to both the first direction and the second direction, is triangular, the first shield region is a trailing shield, a first length at a first position of the magnetic pole along a direction perpendicular to the first direction is greater than a second length at a second position of the magnetic pole along the direction perpendicular to the first direction, the first position is between the second position and the first shield region in the first direction.

* * * * *

UNITED STATES PATENT AND TRADEMARK OFFICE
CERTIFICATE OF CORRECTION

PATENT NO. : 10,943,610 B2
APPLICATION NO. : 16/351050
DATED : March 9, 2021
INVENTOR(S) : Naoyuki Narita et al.

It is certified that error appears in the above-identified patent and that said Letters Patent is hereby corrected as shown below:

In the Claims

In Claim 6, Column 20, Lines 19-20, "second conductive layer conductible," should read --second conductive layer is conductible,--.

In Claim 6, Column 20, Lines 22-23, "fourth conductive layer conductible." should read --fourth conductive layer is conductible.--.

In Claim 12, Column 21, Line 26, "according to claim 1;" should read --according to claim 11;--.

Signed and Sealed this
Ninth Day of August, 2022

Katherine Kelly Vidal
*Director of the United States Patent and Trademark Office*